United States Patent
Aoyanagi et al.

(10) Patent No.: US 12,233,957 B2
(45) Date of Patent: Feb. 25, 2025

(54) VEHICLE WITH IMPROVED FRONT AERODYNAMIC CHARACTERISTIC AND FRONT EXTERIOR MEMBER FOR VEHICLE

(71) Applicant: SUBARU CORPORATION, Tokyo (JP)

(72) Inventors: Hiroki Aoyanagi, Tokyo (JP); Hideki Hata, Tokyo (JP); Masaya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 299 days.

(21) Appl. No.: 17/929,533

(22) Filed: Sep. 2, 2022

(65) Prior Publication Data

US 2023/0085826 A1    Mar. 23, 2023

(30) Foreign Application Priority Data

Sep. 23, 2021 (JP) ................................ 2021-154931

(51) Int. Cl.
| | |
|---|---|
| *B62D 35/00* | (2006.01) |
| *B60R 19/02* | (2006.01) |
| *B62D 25/08* | (2006.01) |
| *B62D 37/02* | (2006.01) |

(52) U.S. Cl.
CPC .............. *B62D 35/00* (2013.01); *B60R 19/02* (2013.01); *B62D 25/08* (2013.01); *B62D 37/02* (2013.01)

(58) Field of Classification Search
CPC ...... B62D 35/00; B62D 35/005; B62D 37/02; Y10T 10/82
USPC ......................... 296/180.1, 180.2, 180.4, 208
See application file for complete search history.

(56) References Cited

U.S. PATENT DOCUMENTS 7,810,867 B2 * 10/2010 Salaverry ............... B62D 35/00
                                                                296/180.1
2016/0194076 A1 * 7/2016 Van Merksteijn ...... B64C 21/10
                                                                428/156

FOREIGN PATENT DOCUMENTS

| DE | 102017008691 | * | 3/2019 |
|---|---|---|---|
| DE | 102017008691 A1 | * | 3/2019 |
| JP | 2001-050215 A | | 2/2001 |
| JP | 2001-280311 A | | 10/2001 |
| JP | 2002-308154 A | | 10/2002 |

* cited by examiner

*Primary Examiner* — Dennis H Pedder
(74) *Attorney, Agent, or Firm* — Smith, Gambrell & Russell, LLP (57) ABSTRACT

A vehicle with an improved front aerodynamic characteristic includes a front exterior member disposed on a front surface of a vehicle body of the vehicle. The front exterior member includes a front inlet port, a funnel member, and a specially processed surface. The front inlet port is formed in the front exterior member. The front inlet port is configured to draw in an airflow in front of the front exterior member. The funnel member is formed around the front inlet port. The specially processed surface is formed on an inner surface of the funnel member, and has recesses that are arrayed.

17 Claims, 7 Drawing Sheets

VEHICLE WITH IMPROVED FRONT AERODYNAMIC CHARACTERISTIC AND FRONT EXTERIOR MEMBER FOR VEHICLE

CROSS-REFERENCE TO RELATED APPLICATIONS

The present application claims priority from Japanese Patent Application No. 2021-154931 filed on Sep. 23, 2021, the entire contents of which are hereby incorporated by reference.

BACKGROUND

The disclosure relates to a vehicle with improved front aerodynamic characteristics and a front exterior member for the vehicle.

A vehicle such as an automobile includes a vehicle body. Airflows are generated around the vehicle body during traveling. Air in a travel direction of the vehicle body strikes against a front surface of the vehicle body, and then, the air is divided along the front surface of the vehicle body into left and right airflows in vehicle width directions. An airflow advancing in the vehicle width direction along the front surface of the vehicle body joins an airflow outside each side surface of the vehicle body at a corner between the front surface and the side surface of the vehicle body. This results in an increase in air pressure at the corner of the vehicle body. Moreover, an airflow running from the corner of the vehicle body along the side surface includes a component flowing outward in the vehicle width direction. This airflow becomes a cause of hindering improvement in aerodynamic performance by the vehicle, such as aerodynamic characteristics and driving stability.

SUMMARY

An aspect of the disclosure provides a vehicle with an improved front aerodynamic characteristic. The vehicle includes a front exterior member disposed on a front surface of a vehicle body of the vehicle. The front exterior member includes a front inlet port, a funnel member, and a specially processed surface. The front inlet port is formed in the front exterior member. The front inlet port is configured to draw in an airflow in front of the front exterior member. The funnel member is formed around the front inlet port. The specially processed surface is formed on an inner surface of the funnel member, and has recesses that are arrayed.

An aspect of the disclosure provides a front exterior member for a vehicle. The front exterior member is configured to be disposed on a front surface of a vehicle body of the vehicle. The front exterior member includes a front inlet port, a funnel member, and a specially processed surface. The front inlet port is formed in the front exterior member. The front inlet port is configured to draw in an airflow in front of the front exterior member. The funnel member is formed around the front inlet port. The specially processed surface is formed on an inner surface of the funnel member, and has recesses that are arrayed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

Japanese Unexamined Patent Application Publication (JP-A) No. 2002-308154 discloses a structure of a vehicle body where an air inlet is formed in a front end of a vehicle so as to guide air to a blowout port in an under cover. In the case of such a structure where a front inlet port is formed in a front surface of the vehicle body so as to draw in an airflow from the front surface of the vehicle body, part of the airflow that strikes against a front surface of a front exterior member is drawn into the air inlet. However, in JP-A No. 2002-308154, it is not considered that the airflow that has struck against the front surface of the front exterior member actually runs along the front surface of the vehicle body toward ends in the vehicle width directions. Generation of the airflows running along the front surface of the vehicle body toward the ends in the vehicle width directions may hinder drawing of the airflow into the air inlet. With the front inlet port formed in the front surface of the vehicle body, the airflow that strikes against the front surface of the vehicle body is not easily drawn in efficiently when the airflows are generated to run along the front surface of the vehicle body toward the ends in the vehicle width directions. As a result, it is considered that the airflows that run along the front surface of the vehicle body toward the ends in the vehicle width directions and reach the corners of the vehicle body are not to be effectively reduced in amount.

It is noted that JP-A No. 2001-050215 and JP-A No. 2001-280311 disclose that a large number of any of projections, recesses (dimples), ribs, or grooves are formed at a surface of an object with which a fluid is in contact so as to form a Karman vortex street on the surface of the object with which the fluid is in contact and to prevent the fluid from being separated from the surface of the object. Even when a plurality of such projections are formed inside the air inlet, for example, it is considered that the airflows that run along the front surface of the vehicle body toward the ends in the vehicle width directions and reach the corners of the vehicle body are not to be effectively reduced in amount. When a plurality of such projections are formed on the front surface of the vehicle body around the air inlet, the airflows that run along the front surface of the vehicle body toward the ends in the vehicle width directions may be accelerated.

In this manner, it is desirable to improve aerodynamic characteristics of the front of the vehicle.

Figure 1:
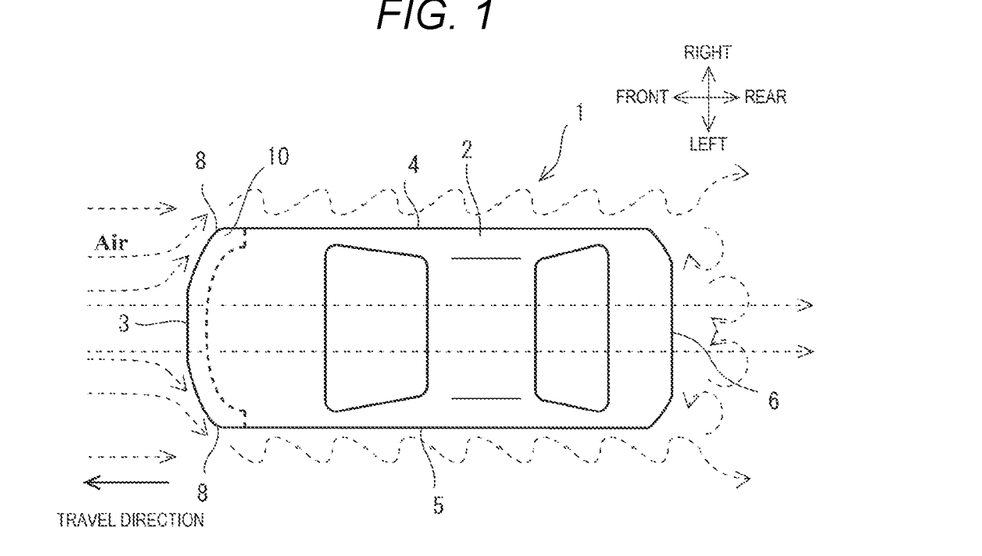
FIG. 1 is a plan view of an automobile according to an embodiment of the disclosure.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is a plan view of an automobile 1 according to an embodiment of the disclosure.

Figure 2:
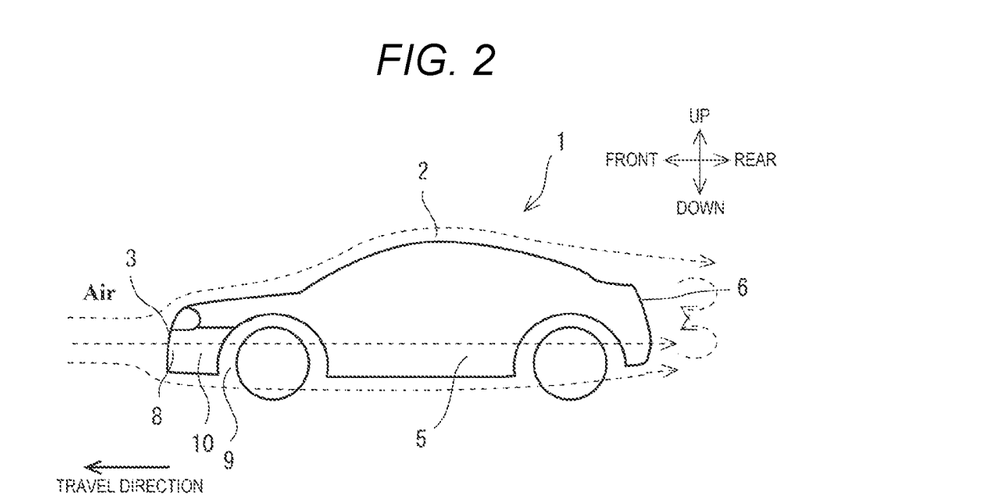
FIG. 2 is a left side view of the automobile in FIG. 1.

FIG. 2 is a side view of the automobile 1 in FIG. 1, illustrating a left side surface 5.

The automobile 1 is an example of the vehicle.

The automobile 1 illustrated in FIGS. 1 and 2 includes a vehicle body 2. The automobile 1 travels mainly forward by an occupant's manual operation or self-driving. Steering enables the automobile 1 to travel forward to the right, forward to the left, rearward to the right, or rearward to the left.

Around the vehicle body 2 during traveling, airflows are generated to run along a shape of the vehicle body 2 as indicated by dashed-line arrows in the drawings. Air in a travel direction of the vehicle body 2 strikes against a front surface 3 of the vehicle body 2, and then, the air is divided along the front surface 3 of the vehicle body 2 into upper and lower airflows, and left and right airflows. As a front exterior member that constitutes an outer surface of the front of the vehicle body 2, a front bumper 10 is disposed at a lower portion of the front surface 3 of the vehicle body 2, for example. After striking against the front bumper 10, airflows run along the front bumper 10 toward both the right and left sides. The airflows respectively join airflows outside both the right and left side surfaces 4, 5 of the vehicle body 2 and run from the front to the rear along both the right and left side surfaces 4, 5 of the vehicle body 2. Air pressures at corners 8 between the front and the side surfaces of the vehicle body 2 are increased. Airflows running rearward from the corners 8 of the vehicle body 2 along the side surfaces 4, 5 include components flowing outward in the lateral directions.

Behind a rear surface 6 of the vehicle body 2, the airflows that have run along the side surfaces 4, 5 and an airflow that has run along an upper surface join together. Behind the rear surface 6 of the vehicle body 2, relatively large vortices are more likely to be generated.

These airflows become a cause of hindering improvement in aerodynamic performance, steering responsiveness, and stability of straightforward travel by the automobile 1.

The front bumper 10 may be a mold component of a resin material, for example. The front bumper 10 extends over an entire width of the front surface 3 of the vehicle body 2 in the lateral direction and has a shape with opposite ends bent rearward along the side surfaces 4, 5. The corners 8 of the front bumper 10 between the front and the side surfaces of the vehicle body 2 have smoothly curved surfaces. Left and right wheelhouses 9 each housing a front wheel of the automobile 1 are located behind the opposite ends of the front bumper 10 that are bent rearward. The wheels are disposed in the respective wheelhouses 9.

Figure 3:
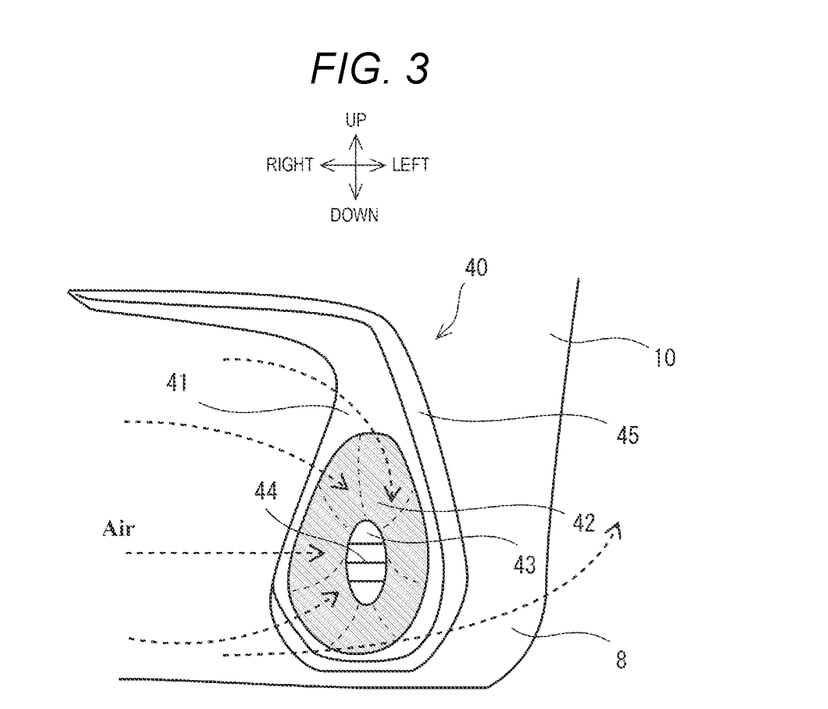
FIG. 3 is a front view of an exterior structure at a left front portion of the automobile in FIG. 1.

FIG. 3 is a front view of an exterior structure at a left front portion of the automobile 1 in FIG. 1.

A left front bumper face 40 is disposed on a left front portion of the front bumper 10. In a similar manner to FIG. 3, a right front bumper face is disposed on a right front portion of the front bumper 10.

The front bumper face 40 in FIG. 3 includes: a face main body 41; a funnel member 42; a front inlet port 43 formed inside the funnel member 42; a plurality of flow guide plates 44; and a crest portion 45 formed along an outer edge of the face main body 41 around the funnel member 42.

Such a front bumper face 40 is attached to the front bumper 10 as the front exterior member, and the front bumper face 40 along with the front bumper 10 constitutes the front exterior member.

The face main body 41 is superposed on the front bumper 10.

The funnel member 42 is formed as a hole in the face main body 41 and has a substantially conical shape vertically elongated. The funnel member 42 is opened in a front surface of the front bumper 10 and is the hole having an inner shape narrowed rearward from the front surface of the front bumper 10. At an end portion of the front bumper 10 in the lateral direction, the funnel member 42 has such a vertically elongated shape that the funnel member 42 is wider in the vertical direction than in the lateral direction.

The front inlet port 43 is formed inside the funnel member 42 of the substantially conical shape. For example, the top of the funnel member 42 of the substantially conical shape is cut to form the front inlet port 43. The front inlet port 43 has a smaller size than an opening of the funnel member 42 in the front surface of the front bumper 10. The front inlet port 43 is surrounded over its entire circumference by an inner surface of the funnel member 42 as indicated by diagonal hatching in the drawing.

The plurality of flow guide plates 44 are disposed in the front inlet port 43. The flow guide plates 44 extend inside the front inlet port 43 along a lateral direction, which is the lateral direction of the vehicle body 2. The plurality of flow guide plates 44 are disposed vertically.

Thus, the front inlet port 43 is formed in the left end portion of the front surface of the front bumper 10 in the lateral direction of the automobile 1.

The funnel member 42 of the substantially conical shape vertically elongated surrounds the front inlet port 43 over the entire circumference. The opening of the funnel member 42 of the substantially conical shape vertically elongated has a larger cross-sectional area than the front inlet port 43. Around the front inlet port 43, the funnel member 42 has a smoothly curved inner surface of the shape tapered from the front surface 3 of the vehicle body 2 toward the front inlet port 43.

The crest portion 45 protrudes forward from the opening in a front surface of the funnel member 42 in the face main body 41. The crest portion 45 continuously extends over a range from an upper side of the funnel member 42 to an outer side of the funnel member 42 in the lateral direction.

Such a front bumper face 40 is provided to thereby cause airflows in front of the front bumper 10 to be drawn into the front inlet port 43 via the funnel member 42 as indicated by dashed-line arrows in the drawing. Some of the airflows run over the crest portion 45 to each end of the front bumper 10 in the lateral direction. However, most of the airflows do not run over the crest portion 45 but can be drawn into the front inlet port 43 via the funnel member 42.

Figure 4:
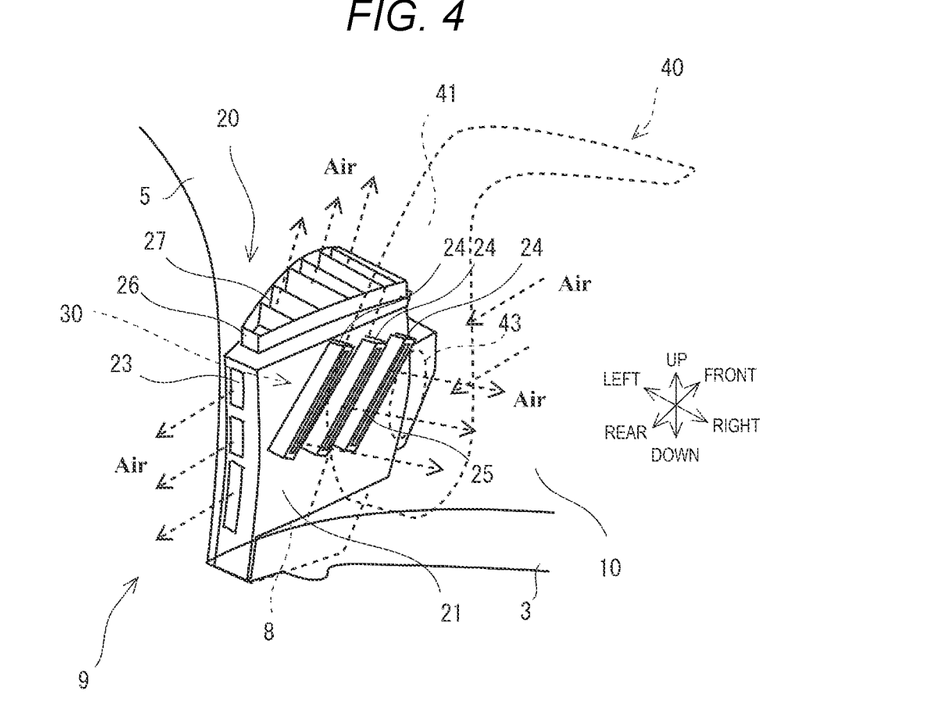
FIG. 4 is a perspective view of an interior structure at the left front portion in FIG. 3.

FIG. 4 is a perspective view of an interior structure at the left front portion of the automobile 1 in FIG. 3.

As illustrated in FIG. 4, a left duct member 20 is disposed inside the left front portion of the front bumper 10. In a similar manner to FIG. 4, a right duct member 20 is disposed inside the right front portion of the front bumper 10.

The duct member 20 includes a duct main body 21, rear outlet ports 23, inner branch duct portions 24, inner branch outlet ports 25, an upper branch duct portion 26, and upper branch outlet ports 27.

The duct main body 21 is superposed on a side portion of the front bumper 10 from inside. Thus, a duct structure 30 is formed inside the side portion of the front bumper 10. The duct main body 21 may be superposed on the inner surface of the front bumper 10 from the front portion of the front bumper 10 where the left-side front inlet port 43 is opened, to a rear end of the side portion of the front bumper 10.

The duct main body 21 may have, for example, a hollow cubic shape partly cut along the inner surface of the front bumper 10. An edge of the duct main body 21 as a result of cutting may be adhered or fused to the inner surface of the front bumper 10. A seam member may be held between the edge of the duct main body 21 as a result of cutting and the inner surface of the front bumper 10. Thus, the duct structure 30 having the duct main body 21 superposed on the inner surface of the front bumper 10 can withstand a high inner pressure.

In such a duct structure 30, the front inlet port 43 on the left side of the front bumper 10 serves as an inlet hole configured to introduce airflows in front of the front bumper 10 into the duct structure 30.

It is noted that the duct main body 21 as a single member may have a hollow cubic shape along the inner surface of the front bumper 10. In this case, an inlet hole configured to draw air into the duct structure 30 may be formed in a portion of the duct main body 21 that overlaps the front inlet port 43 on the left side of the front bumper 10.

The rear outlet ports 23 are outlet holes configured to discharge air from the duct structure 30. The rear outlet ports 23 are formed in a rear end portion of the duct main body 21. The rear outlet ports 23 may be, for example, a plurality of vertically elongated holes arrayed vertically in the rear end portion of the duct main body 21. In this case, the rear outlet ports 23 discharge the air in the duct structure 30 to the wheelhouse 9 located behind the front bumper 10. The rear outlet ports 23 to the wheelhouse 9 are vertically elongated along an outer edge of the wheelhouse 9.

Airflows that enter the duct structure 30 via the front inlet port 43 on the left side of the front bumper 10 can be guided by the duct structure 30 and run inside the front bumper 10 from the front to the rear of the vehicle body 2 so as to be discharged from the rear outlet ports 23 at the rear of the corner 8 of the front bumper 10.

In the duct main body 21, the inner branch duct portions 24 are formed in an intermediate portion of a passage section from the front inlet port 43 to the rear outlet ports 23. The inner branch duct portions 24 protrude from the duct main body 21 toward a center YO of the vehicle width direction.

The inner branch outlet ports 25 are formed in distal ends of the inner branch duct portions 24. Airflows running via the inner branch duct portions 24 toward the inner branch outlet ports 25 intersect, at an obtuse angle, a direction of the airflows running from the front inlet port 43 to the rear outlet ports 23 in the duct structure 30. The airflows running from the front inlet port 43 to the rear outlet ports 23 in the duct structure 30 meet strong resistance when the airflows are about to run toward the inner branch duct portions 24.

Airflows discharged from the inner branch outlet ports 25 are passed to an engine room disposed on an inner side of the front bumper 10.

In the duct main body 21, the upper branch duct portion 26 is formed in an intermediate portion of the passage section from the front inlet port 43 to the rear outlet ports 23. The upper branch duct portion 26 protrudes upward from the duct main body 21.

The upper branch outlet ports 27 are formed in a distal end of the upper branch duct portion 26. Airflows running via the upper branch duct portion 26 toward the upper branch outlet ports 27 intersect, at an obtuse angle, a direction of the airflows running from the front inlet port 43 to the rear outlet ports 23 in the duct structure 30. The airflows running from the front inlet port 43 to the rear outlet ports 23 in the duct structure 30 meet strong resistance when the airflows are about to run toward the upper branch duct portion 26.

Airflows discharged from the upper branch outlet ports 27 are passed to the engine room on the inner side of the front bumper 10.

In this manner, the airflows drawn in via the funnel member 42 of the front bumper face 40 basically run via the front inlet port 43 and the duct main body 21 and are discharged from the rear outlet ports 23 to the wheelhouse 9.

Then, some of the airflows drawn in run via the inner branch duct portions 24 and the upper branch duct portion 26 that are disposed in the passage section from the front inlet port 43 to the rear outlet ports 23 so that the airflows can be discharged from the inner branch outlet ports 25 and the upper branch outlet ports 27 into the inner side of the front bumper 10.

At least some of the airflows that have struck against the front bumper 10 and run outward in the lateral direction along the front bumper 10 can be drawn in from the funnel member 42 of the front bumper face 40. None of the airflows that have struck against the front bumper 10 reach the corner 8 of the front bumper 10. The airflows jetted out from the corner 8 of the front bumper 10 are reduced in air pressure. As a result, the airflows running along the side surfaces 4, 5 of the vehicle body 2 can be prevented from being made turbulent when the airflows along the side surfaces 4, 5 are regarded as a reference.

Figure 5:
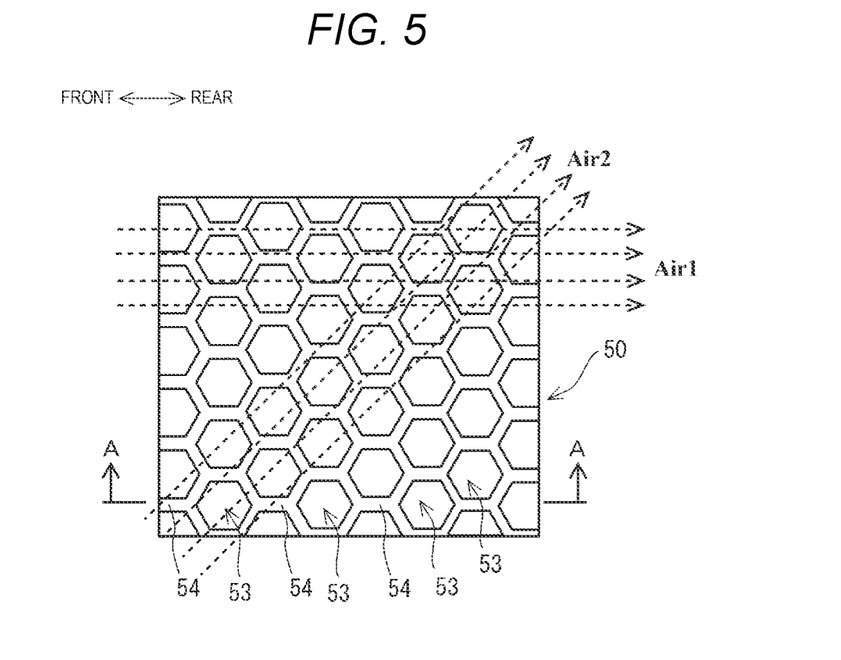
FIG. 5 is a diagram illustrating a specially processed surface sheet for forming a specially processed surface on an inner surface of a funnel member of a front bumper face in FIG. 3.

FIG. 5 is a diagram illustrating a specially processed surface sheet 50 for forming a specially processed surface on the inner surface of the funnel member 42 of the front bumper face 40 in FIG. 3.

Figure 6:
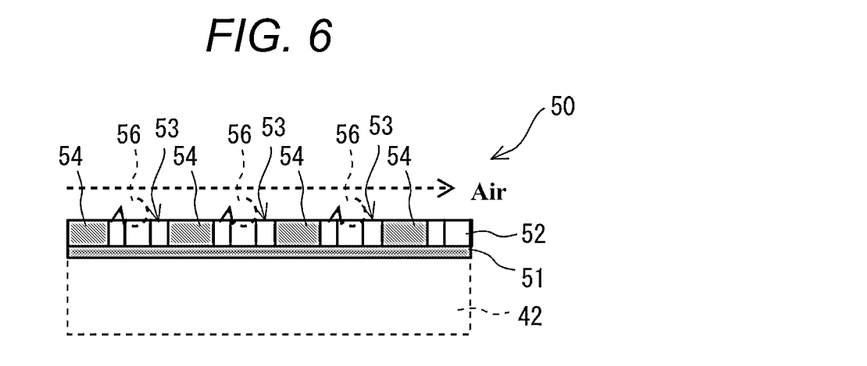
FIG. 6 is a cross-sectional view of the specially processed surface sheet, taken along line A-A in FIG. 5.

FIG. 6 is a cross-sectional view of the specially processed surface sheet 50, taken along line A-A in FIG. 5.

As illustrated in FIG. 6, the specially processed surface sheet 50 is adhered to a whole surface of the funnel member 42 of the front bumper face 40 so that the specially processed surface can be formed on the whole inner surface of the funnel member 42.

The specially processed surface sheet 50 includes a base material 51 and a surface layer 52 superposed on a surface of the base material 51.

The base material 51 may be made of a flexible member of a polyurethane resin, for example, having flexibility to closely fit to the curved surface. The base material 51 may include an adhesive layer adherable to the inner surface of the funnel member 42 by heating.

In the surface layer 52, a plurality of recesses 53 of a regular hexagonal shape are bored densely in a hexagonal lattice pattern. Thus, in the surface layer 52, a crest portion 54 is formed among the adjacent recesses 53. The crest portion 54 surrounds each of the recesses 53 in a hexagonal shape. Since the plurality of recesses 53 of the regular hexagonal shape are bored in the surface layer 52, the surface layer 52 includes the crest portion 54 of a mesh shape similar to a cross section of a honeycomb. As illustrated in FIG. 6, when adhered to the curved inner surface of the funnel member 42, the surface layer 52 also has the plurality of recesses 53 of a substantially hexagonal shape and the crest portion 54 of the mesh shape surrounding the recesses 53.

It is noted that the recesses 53 in this embodiment are formed in a pillar shape of a substantially regular hexagon similar to the regular hexagonal openings of the recesses 53. The regular hexagonal openings of the recesses 53 may have an inner shape having a concavely curved surface or an inner shape having a trapezoidal cross section.

Moreover, the plurality of recesses 53 in the specially processed surface sheet 50 may have a shape and size not strictly identical. When the inner surface of the funnel member 42 is curved as in this embodiment, for example, the recesses 53 in the specially processed surface sheet 50 may have such similar shapes that the recesses 53 have substantially the same size in a state adhered to the curved inner surface.

When an airflow AIR runs along a surface of the specially processed surface sheet 50 as illustrated in FIG. 6, part of the airflow AIR enters the recesses 53, and circular flows running round along a direction of the airflow AIR are generated. As a result, minute vortices 56 are generated above the recesses 53. On the specially processed surface sheet 50 with the plurality of recesses 53 densely arranged (arrayed), a turbulent boundary layer can be formed of a plurality of the minute vortices 56 generated above the plurality of recesses 53.

Moreover, because the specially processed surface sheet 50 with the plurality of recesses 53 is formed on the whole inner surface of the funnel member 42 of the front bumper face 40, airflows more easily run inside the funnel member 42 along a fore-and-aft direction of the funnel member 42 even in the vicinity of the inner surface of the funnel member 42. The airflows running along the fore-and-aft direction in the funnel member 42 can use an inside of the funnel member 42 widely and effectively.

Figure 7:
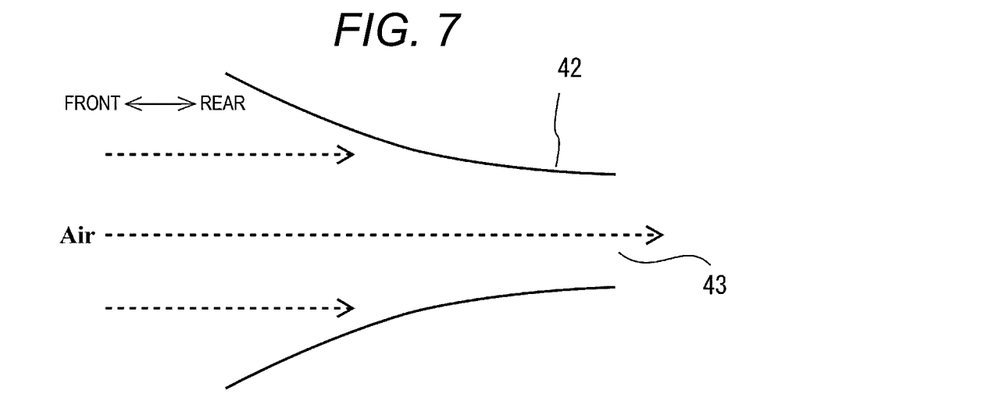
FIG. 7 is a diagram illustrating airflows inside the funnel member having a curved inner surface where no specially processed surface is formed of the specially processed surface sheet in FIG. 5 in a comparative example.

FIG. 7 is a diagram illustrating airflows inside the funnel member 42 having a curved inner surface where no specially processed surface is formed of the specially processed surface sheet 50 in FIG. 5 in a comparative example.

Figure 8:
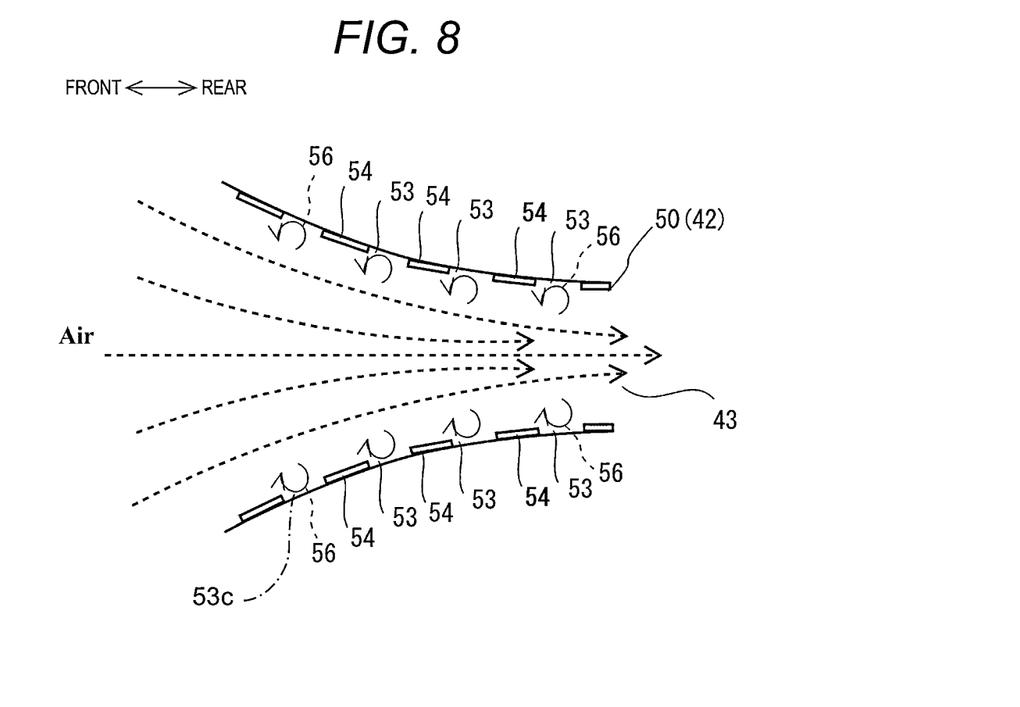
FIG. 8 is a diagram illustrating airflows inside the funnel member having the curved inner surface where the specially processed surface is formed of the specially processed surface sheet in FIG. 5 in this embodiment.

FIG. 8 is a diagram illustrating airflows inside the funnel member 42 having the curved inner surface where the specially processed surface is formed of the specially processed surface sheet 50 in FIG. 5 in this embodiment.

The funnel member 42 has a substantially conical shape of the curved inner surface and has an inner shape tapered toward the front inlet port 43.

FIGS. 7 and 8 each illustrate a cross section of the funnel member 42.

As illustrated in FIG. 7, when no specially processed surface is formed on the inner surface of the funnel member 42 tapered toward the front inlet port 43, and even when the opening in the front surface of the funnel member 42 is enlarged, an amount of airflows that can run into the front inlet port 43 via the funnel member 42 basically corresponds approximately to a cross-sectional area of the front inlet port 43. Airflows about to run in the vicinity of the surface of the funnel member 42 are more likely to be hindered from advancing by airflows about to run into the front inlet port 43 in the vicinity of a center of the funnel member 42.

In contrast, as illustrated in FIG. 8, when the specially processed surface is formed on the inner surface of the funnel member 42 tapered toward the front inlet port 43, the plurality of the minute vortices 56 are generated above the plurality of recesses 53 in the inner surface of the funnel member 42 so that the turbulent boundary layer can be formed along the inner surface of the funnel member 42.

Airflows running in the vicinity of the inner surface of the funnel member 42 advance along the inner surface shape of the funnel member 42 more easily to reach the front inlet port 43. Airflows about to run in the vicinity of the inner surface of the funnel member 42 become less likely to be hindered from advancing toward the front inlet port 43.

As a result, an amount of airflows that can enter the front inlet port 43 via the funnel member 42 in this embodiment becomes larger than when no specially processed surface is formed. As the opening in the front surface of the funnel member 42 is enlarged, the amount of airflows that can enter the front inlet port 43 via the funnel member 42 is increased. A larger amount of airflows than presumable from the cross-sectional area of the front inlet port 43 can be drawn into the front inlet port 43 by the funnel member 42. A large amount of airflows in accordance with the opening in the front surface of the funnel member 42 can be efficiently drawn into the front inlet port 43.

Particularly because the specially processed surface is formed on the inner surface of the funnel member 42 over the entire circumference so as to surround the front inlet port 43, the effect of drawing in the airflows by the funnel member 42 can be increased.

As illustrated in FIG. 5, the recesses 53 of a regular polygonal or circular shape that are less likely to cause airflows to have directionality above the specially processed surface are employed so that the airflows can run in the vicinity of the surface of the specially processed surface sheet 50 while forming the turbulent boundary layer of the plurality of minute vortices 56 in any direction without being affected by an arrangement direction of the plurality of recesses 53 as indicated by first airflows Air1 along the fore-and-aft direction and second airflows Air2 across the first airflows Air1 in the drawing. As a result, the funnel member 42 can draw in the airflows effectively even when the plurality of recesses 53 are not arranged along the fore-and-aft direction in the inner surface of the funnel member 42 as illustrated in FIG. 8. Furthermore, even when the airflows are at an angle to those illustrated in FIG. 8, the funnel member 42 can draw in the airflows effectively.

Figure 9:
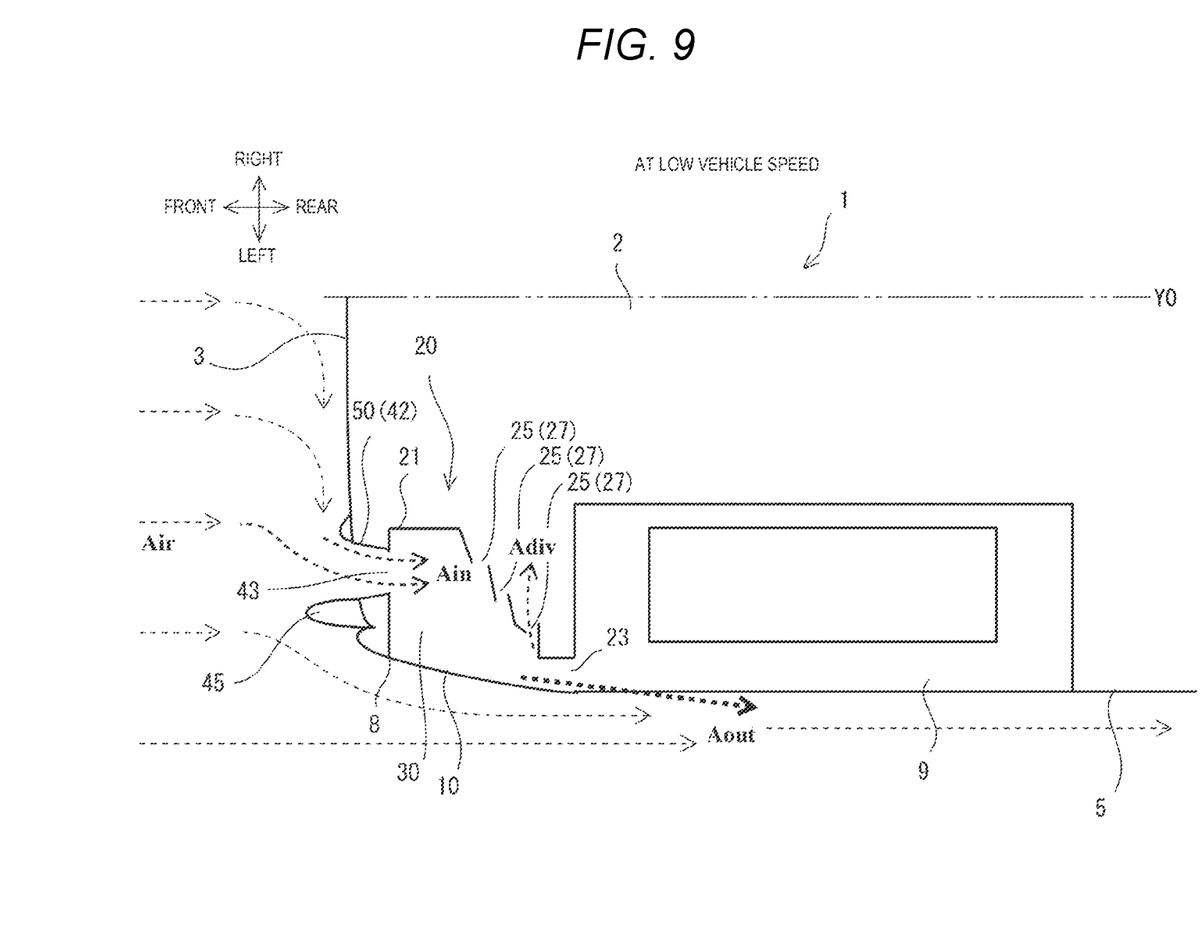
FIG. 9 is a diagram illustrating airflows in the left front structure in FIGS. 3 to 5 at a low vehicle speed.

FIG. 9 is a diagram illustrating airflows in the left front structure in FIGS. 3 to 5 at a low vehicle speed.

Airflows in the right front structure of the automobile 1 appear symmetric to those in FIG. 9.

In FIG. 9, air on a front side of the travel direction of the vehicle body 2 strikes against the front surface 3 of the vehicle body 2 as indicated by dashed-line arrows in the drawing, and then, the air flows to the left along the front surface 3 of the vehicle body 2. Airflows running to the left along the front surface 3 are drawn into the funnel member 42. Particularly because the crest portion 45 is formed around the funnel member 42, the airflows about to run to the left along the front surface 3 are hindered from running to the left and become more likely to be drawn into the funnel member 42. Basically, airflows that have struck against the front surface 3 of the vehicle body 2 become less likely to pass by the front side of the funnel member 42 of the front bumper face 40 outward.

The airflows that have been drawn into the funnel member 42 pass through the funnel member 42 extending in the fore-and-aft direction and consequently change into flows in the fore-and-aft direction. The airflows that have generated flows in the fore-and-aft direction run toward the front inlet port 43 of the front bumper face 40 and enter the duct main body 21 of the duct member 20 via the front inlet port 43. Then, the airflows running in the duct structure 30 including the duct main body 21 are discharged from the rear outlet ports 23 to the wheelhouse 9. An airflow Aout discharged from the rear outlet ports 23 runs toward an outer side of a wheel member disposed in the wheelhouse 9.

It is noted that an amount of the airflows drawn in is relatively small at a low vehicle speed so that an air pressure in the duct main body 21 is relatively low. In this case, most of the airflows that enter the duct main body 21 are discharged from the rear outlet ports 23 to the wheelhouse 9. An airflow Adiv to the inner branch duct portions 24 is hardly generated. The airflow Adiv is a flow that intersects a direction of the airflows running from the front inlet port 43 to the rear outlet ports 23 in the duct structure 30. The same applies to the upper branch duct portion 26.

In this manner, most of the airflows that strike against the front surface 3 of the vehicle body 2 at a low vehicle speed are drawn into the funnel member 42 of the front bumper face 40, run via the duct structure 30, and are discharged to the wheelhouse 9. Most of the airflows that strike against the front surface 3 of the vehicle body 2 at a low vehicle speed become less likely to reach the corners 8 of the vehicle body 2. As a result, an amount of airflows that join the airflows running outside the side surfaces 4, 5 of the vehicle body 2 is reduced. The airflows (main flows) running outside the side surfaces 4, 5 of the vehicle body 2 become less likely to be made turbulent by the airflows running from the front surface 3 of the vehicle body 2 to the corners 8. Hindrance of traveling of the automobile 1 by turbulence of the airflows around the vehicle body 2 can be reduced.

Figure 10:
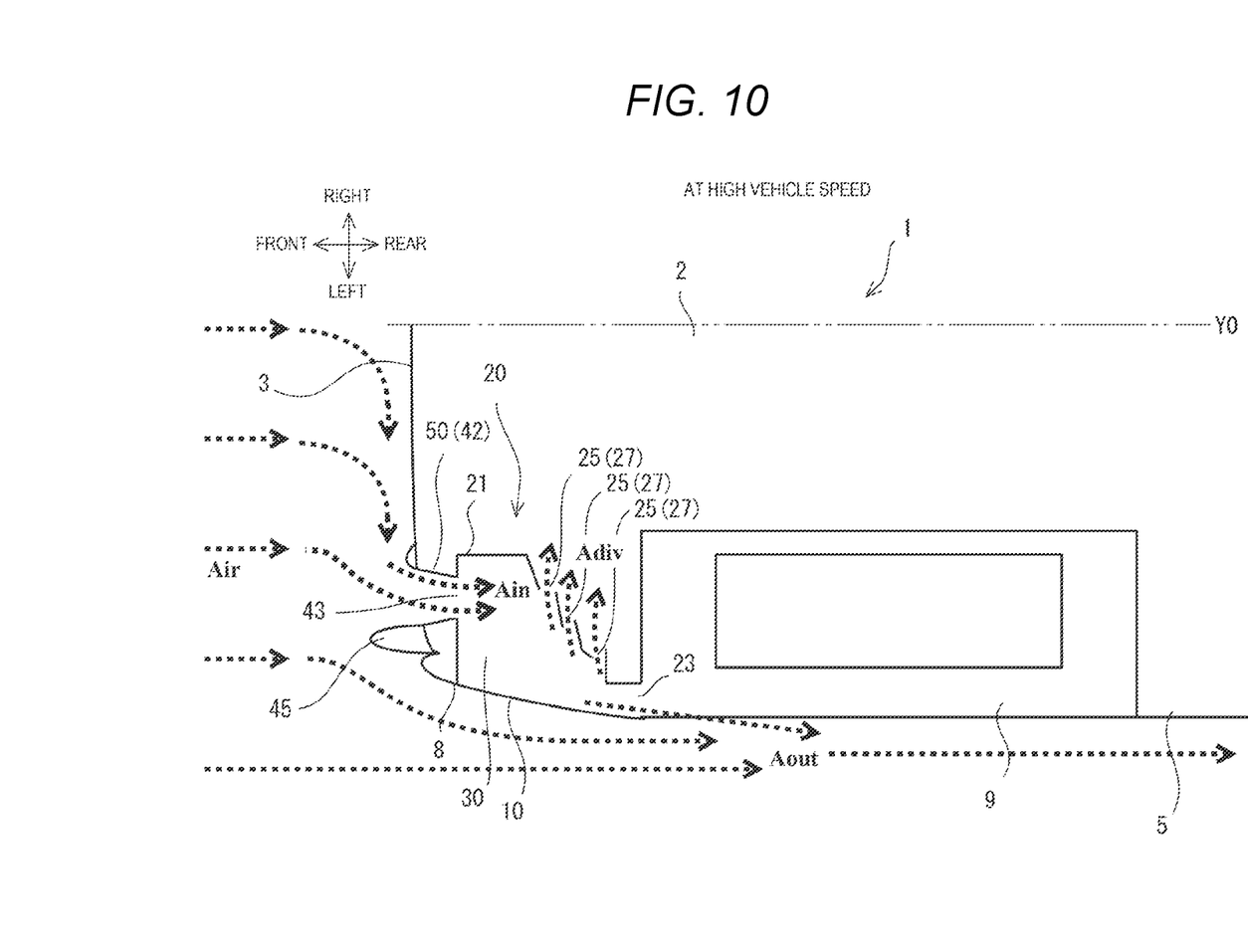
FIG. 10 is a diagram illustrating airflows in the left front structure in FIGS. 3 to 5 at a high vehicle speed.

FIG. 10 is a diagram illustrating airflows in the left front structure in FIGS. 3 to 5 at a high vehicle speed.

Airflows in the right front structure of the automobile 1 appear symmetric to those in FIG. 10.

In FIG. 10, air on the front side of the travel direction of the vehicle body 2 strikes against the front surface 3 of the vehicle body 2 as indicated by dashed-line arrows in the drawing, and then, the air flows to the left along the front surface 3 of the vehicle body 2. An amount of airflows at a high vehicle speed is larger than that at a low vehicle speed. Airflows running to the left along the front surface 3 are drawn into the funnel member 42. The crest portion 45 formed around the funnel member 42 hinders the airflows about to run to the left along the front surface 3 from running to the left, and the airflows become more likely to be drawn into the funnel member 42. Even though the amount of the airflows is larger at a higher vehicle speed than in the case of FIG. 9, the airflows are efficiently drawn into the funnel member 42.

The airflows that have been drawn into the funnel member 42 pass through the funnel member 42 extending in the fore-and-aft direction and consequently change into flows in the fore-and-aft direction. Since the specially processed surface is formed on the whole inner surface of the funnel member 42, a large amount of airflows unlimited by the size of the front inlet port 43 can be efficiently drawn into the funnel member 42.

The air pressure in the duct main body 21 that the large amount of airflows enter becomes accordingly higher than in the case of FIG. 9. Part of the airflows that enter the duct main body 21 become less likely to be discharged from the rear outlet ports 23 to the wheelhouse 9. The airflows less likely to be discharged are passed into the vehicle body 2 via the inner branch outlet ports 25 or the upper branch outlet ports 27. This prevents an increase in air pressure in the duct main body 21. As a result, even when the large amount of airflows enter the duct main body 21, the air pressure in the duct main body 21 can be prevented from increasing. With the air pressure in the duct main body 21 being prevented from increasing, the airflows running into the duct main body 21 via the front inlet port 43 become less likely to be hindered. Even at a high vehicle speed, air drawing performance by the funnel member 42 having the inner surface where the specially processed surface is wholly formed becomes less likely to be hindered by an increase in the air pressure in the duct main body 21.

In this manner, most of the airflows that strike against the front surface 3 of the vehicle body 2 are drawn into the funnel member 42 of the front bumper face 40 as effectively as at a low vehicle speed, and the airflows become less likely to reach the corners 8 of the vehicle body 2. As a result, even at a high vehicle speed, in a similar manner to the case at a low vehicle speed, an amount of airflows that join the airflows running outside the side surfaces 4, 5 of the vehicle body 2 can be reduced. The airflows (main flows) running outside the side surfaces 4, 5 of the vehicle body 2 become less likely to be made turbulent by the airflows running from the front surface 3 of the vehicle body 2 to the corners 8. This can reduce hindrance of traveling of the automobile 1 by turbulence of the airflows.

As described above, in this embodiment, the funnel member 42 is formed around the front inlet port 43 formed in the front bumper face 40 via which the airflows in front of the front bumper 10 are drawn in. The funnel member 42 has the inner surface of the shape tapered from the front surface 3 of the vehicle body 2 toward the front inlet port 43. Thus, airflows in front of the funnel member 42 are guided along the inner shape of the funnel member 42 formed around the front inlet port 43 so that the airflows can run in the fore-and-aft direction and be drawn into the front inlet port 43 efficiently. In this embodiment, airflows running in the fore-and-aft direction to be drawn into the front inlet port 43 are generated so that the airflows in front of the front bumper 10 running along a front surface of the front bumper 10 can be efficiently drawn into the front inlet port 43.

Moreover, in this embodiment, the specially processed surface is formed on the inner surface of the funnel member 42 configured to generate airflows in the fore-and-aft direction, and the plurality of recesses 53 are densely formed in a regular pattern in the whole specially processed surface. The airflows running in the fore-and-aft direction in the funnel member 42 easily run in the vicinity of the inner surface of the funnel member 42 along the inner shape of the funnel member 42. In the funnel member 42, the airflows running in the fore-and-aft direction along the inner shape of the funnel member 42 can be widely generated wholly inside of the funnel member 42. This enhances drawing performance of the airflows by the funnel member 42. As a result, in this embodiment, the airflows, which are originally about to run along the front surface of the front bumper 10, are strongly and efficiently drawn from the front surface of the front bumper 10 toward the funnel member 42.

In particular, in the specially processed surface, the plurality of recesses 53 of the hexagonal shape are highly densely disposed in a regular pattern having a higher density than a matrix pattern. Thus, as compared with the case where the plurality of recesses 53 are disposed in the matrix pattern in the specially processed surface, for example, the airflows running along the fore-and-aft direction inside the funnel member 42 more easily run in the vicinity of the inner surface of the funnel member 42 and become more likely to run along the inner shape of the funnel member 42. Turbulence of the airflows inside the funnel member 42 can be prevented to effectively use the inside of the funnel member 42 so as to enlarge an effective area where airflows in the fore-and-aft direction can be generated.

In this embodiment, the plurality of recesses 53 are uniformly formed in the identical shape including similar shapes, and the recesses 53 are formed in the inner surface of the funnel member 42 over the entire circumference so as to surround the front inlet port 43. Consequently, the airflows running in the fore-and-aft direction along the specially processed surface inside the funnel member 42 become less likely to have directionality in flowing easiness. Directions of the airflows running in the fore-and-aft direction in the funnel member 42 may change in accordance with a travel state or a travel environment of the automobile 1. In this embodiment, the specially processed surface is less likely to cause directionality in flowing easiness so that even when such a change occurs in the airflows, a constant flowing acceleration effect can be obtained. In this embodiment, irrespective of the travel state or the travel environment of the automobile 1, stability of the airflows running inside the funnel member 42 can be obtained.

As a result, in this embodiment, even when the airflows strike against the front surface of the front bumper 10 and are about to run along the front surface of the front bumper 10 toward the ends in the lateral directions, that is, even when such airflows are generated in front of the front surface 3 of the vehicle body 2 where the front bumper 10 is disposed, most of the airflows can be drawn into the front inlet port 43 via the funnel member 42. In this embodiment, aerodynamic characteristics of the front of the vehicle body 2 can be improved by reducing the amount of the airflows about to run from the front surface 3 of the vehicle body 2, pass by the corners 8, which are the ends of the vehicle body 2 where the front bumper 10 is disposed in the vehicle width directions, namely, the lateral directions, and run rearward along the side surfaces 4, 5.

Although the above-described embodiment is a suitable example of the embodiment for the disclosure, the disclosure is not limited to this embodiment but may be modified or altered in various manners without departing from the subject matter of the disclosure.

Figure 11:
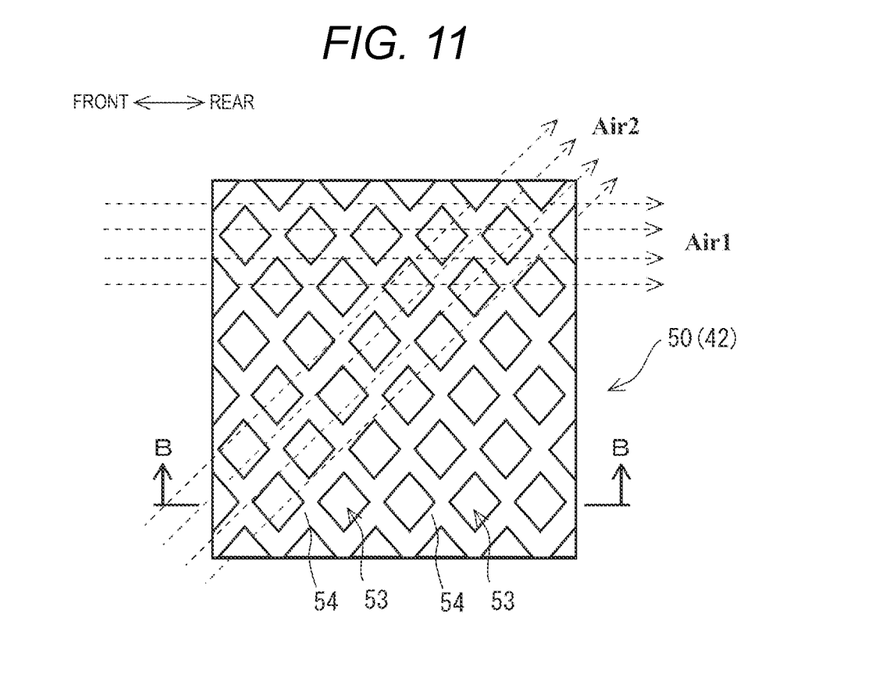
FIG. 11 is a diagram illustrating a modified example of the specially processed surface sheet in FIG. 5.

FIG. 11 is a diagram illustrating a modified example of the specially processed surface sheet 50 in FIG. 5.

Figure 12:
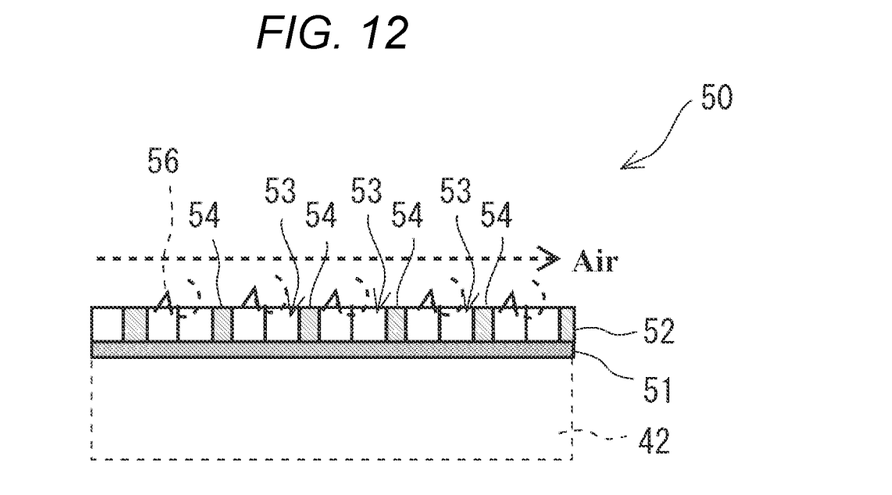
FIG. 12 is a cross-sectional view of the specially processed surface sheet, taken along line B-B in FIG. 11.

FIG. 12 is a cross-sectional view of the specially processed surface sheet 50, taken along line B-B in FIG. 11.

The specially processed surface sheet 50 in FIGS. 11 and 12 is different from that in FIGS. 5 and 6 in that the recesses 53 of a rhombic shape are formed.

A plurality of the rhombic recesses 53 are disposed in the center and each corner of the hexagonal lattice of the specially processed surface sheet 50.

Each of an inside of the recesses 53 may have, for example, a concavely curved shape or a trapezoidal cross-sectional shape.

When such a plurality of rhombic recesses 53 are formed in the specially processed surface sheet 50, substantially the same effect as the above-described embodiment can be expected.

It is noted that an inner shape of the rhombic recesses 53 may be a pillar shape of a rhombus similar to the openings of the recesses 53.

The plurality of recesses 53 formed in the specially processed surface sheet 50 may have a circular shape or a polygonal shape other than the hexagonal and rhombic shapes (e.g., FIG. 8 further adds a depiction of an alternate embodiment circular recess 53*c*).

Moreover, the plurality of recesses 53 formed in the specially processed surface sheet 50 may have a shape and size not strictly identical.

In such cases as well, substantially the same effect as the above-described embodiment can be expected.

The invention claimed is:

1. A vehicle with an improved front aerodynamic characteristic, the vehicle comprising:
  a front exterior member disposed on a front surface of a vehicle body of the vehicle, wherein
  the front exterior member comprises
    a front inlet port formed in the front exterior member, the front inlet port being configured to draw in an airflow in front of the front exterior member,
    a funnel member formed around the front inlet port, and
    a specially processed surface formed on an inner surface of the funnel member, the specially processed surface having recesses that are arrayed, and
  wherein the front inlet port, which is surrounded by the funnel member, defines a central flow axis that is positioned in an end of the front exterior member in a vehicle width direction of the vehicle.

2. The vehicle according to claim 1, wherein the recesses have an identical shape of a polygon, a rhombus, or a circle.

3. The vehicle according to claim 1, wherein the specially processed surface where the recesses are arrayed is formed on the inner surface of the funnel member over an entire circumference of the funnel member so as to surround the front inlet port.

4. The vehicle according to claim 2, wherein the specially processed surface where the recesses are arrayed is formed on the inner surface of the funnel member over an entire circumference of the funnel member so as to surround the front inlet port.

5. The vehicle according to claim 1, wherein
  the front exterior member comprises a crest portion protruding forward from the funnel member, and
  the crest portion continuously extends over a range from an upper side of the funnel member to an outer side of the funnel member in the vehicle width direction.

6. The vehicle according to claim 2, wherein
  the front exterior member comprises a crest portion protruding forward from the funnel member, and
  the crest portion continuously extends over a range from an upper side of the funnel member to an outer side of the funnel member in the vehicle width direction.

7. The vehicle according to claim 3, wherein
  the front exterior member comprises a crest portion protruding forward from the funnel member, and the crest portion continuously extends over a range from an upper side of the funnel member to an outer side of the funnel member in the vehicle width direction.

8. The vehicle according to claim 4, wherein
the front exterior member comprises a crest portion protruding forward from the funnel member, and
the crest portion continuously extends over a range from an upper side of the funnel member to an outer side of the funnel member in the vehicle width direction.

9. A vehicle with an improved front aerodynamic characteristic, the vehicle comprising:
a front exterior member disposed on a front surface of a vehicle body of the vehicle, wherein
the front exterior member comprises
a front inlet port formed in the front exterior member, the front inlet port being configured to draw in an airflow in front of the front exterior member,
a funnel member formed around the front inlet port, and
a specially processed surface formed on an inner surface of the funnel member, the specially processed surface having recesses that are arrayed, and the vehicle further comprising:
a duct structure coupled, inside the front exterior member, to the front inlet port, wherein
the duct structure comprises
a rear outlet port configured to discharge air to a wheelhouse located behind the front exterior member in the vehicle body, and
a branch outlet port formed in a passage section from the front inlet port to the rear outlet port.

10. The vehicle according to claim 2, further comprising:
a duct structure coupled, inside the front exterior member, to the front inlet port, wherein
the duct structure comprises
a rear outlet port configured to discharge air to a wheelhouse located behind the front exterior member in the vehicle body, and
a branch outlet port formed in a passage section from the front inlet port to the rear outlet port.

11. The vehicle according to claim 3, further comprising:
a duct structure coupled, inside the front exterior member, to the front inlet port, wherein
the duct structure comprises
a rear outlet port configured to discharge air to a wheelhouse located behind the front exterior member in the vehicle body, and
a branch outlet port formed in a passage section from the front inlet port to the rear outlet port.

12. The vehicle according to claim 4, further comprising:
a duct structure coupled, inside the front exterior member, to the front inlet port, wherein
the duct structure comprises
a rear outlet port configured to discharge air to a wheelhouse located behind the front exterior member in the vehicle body, and
a branch outlet port formed in a passage section from the front inlet port to the rear outlet port.

13. The vehicle according to claim 1, wherein the front exterior member comprises a front bumper face member that constitutes an outer surface of a front of the vehicle body.

14. The vehicle according to claim 2, wherein the front exterior member comprises a front bumper face member that constitutes an outer surface of a front of the vehicle body.

15. The vehicle according to claim 3, wherein the front exterior member comprises a front bumper face member that constitutes an outer surface of a front of the vehicle body.

16. The vehicle according to claim 4, wherein the front exterior member comprises a front bumper face member that constitutes an outer surface of a front of the vehicle body.

17. A front exterior member for a vehicle, comprising:
a front inlet port formed in the front exterior member, the front inlet port being configured to draw in an airflow in front of the front exterior member, the front exterior member configured to be disposed on a front surface of a vehicle body of the vehicle;
a funnel member formed around the front inlet port; and
a specially processed surface formed on an inner surface of the funnel member, the specially processed surface having recesses that are arrayed, and
wherein the front inlet port, which is surrounded by the funnel member, defines a central flow axis that is positioned in an end of the front exterior member in a vehicle width direction of the vehicle.

* * * * *